Feb. 23, 1971   D. B. ROGERS ET AL   3,565,682
CERAMIC ELECTRICAL RESISTORS CONTAINING PdMO$_2$, WHERE
M IS Co, Cr, Rh OR Cr/Rh
Original Filed April 2, 1968

INVENTORS
DONALD B. ROGERS
ROBERT D. SHANNON

BY *James N Ryan*

ATTORNEY 3,565,682
CERAMIC ELECTRICAL RESISTORS CONTAINING PdMO$_2$, WHERE M IS Co, Cr, Rh OR Cr/Rh
Donald B. Rogers and Robert D. Shannon, Wilmington, Del., assignors to E. I. du Pont de Nemours and Company, Wilmington, Del., a corporation of Delaware
Application Apr. 2, 1968, Ser. No. 718,046, now Patent No. 3,498,931, dated Mar. 3, 1970, which is a continuation-in-part of application Ser. No. 625,318, Mar. 23, 1967. Divided and this application Sept. 25, 1969, Ser. No. 860,886
Int. Cl. C01g 55/100; H07b 1/08
U.S. Cl. 117—201                                12 Claims

ABSTRACT OF THE DISCLOSURE

Palladium oxides of the formula PdMO$_2$, wherein M is cobalt, chromium, rhodium, or a mixture of chromium with rhodium, can be mixed with a vitreous enamel or glass frit and optionally with other additives to form ceramic electrical resistor compositions. Such compositions are applied to a ceramic dielectric substrate and fired, forming the conductive coating of a ceramic electrical resistor.

RELATED APPLICATIONS

This is a division of application Ser. No. 718,046, filed Apr. 2, 1968, now Pat. 3,498,931, which was a continuation-in-part of application Ser. No. 625,318, filed Mar. 23, 1967, and now abandoned.

BACKGROUND OF THE INVENTION

This invention relates to new palladium-containing compositions suitable for making electric resistors and to electric resistors made therewith.

The parent application Ser. No. 718,046 discloses new metal oxides of the generic formula PdMO$_2$, wherein M is cobalt, chromium, rhodium, or a mixture of chromium and rhodium. These oxides, which are good electrical conductors, can be prepared by such techniques as, for example, heating PdCl$_2$ with an oxide of the metal M at 600–950° C. in a closed vessel. They have a crystal structure based on the rhombohedral space group R$\bar{3}$m.

SUMMARY

According to this invention, metal oxides of the formula PdMO$_2$, wherein M is Co, Cr, Rh, or a Cr/Rh mixture can be incorporated into ceramic compositions suitable for use in electric resistors. Such compositions can be made by mixing a finely divided oxide PdMO$_2$ with a powdered dielectric material, such as finely divided vitreous enamel or glass frit. The composition is applied to a ceramic dielectric substrate and fired thereon to produce an electrical resistor.

DRAWINGS

Figure 1:
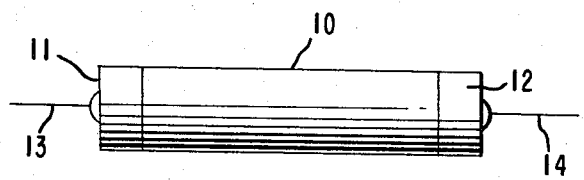
Figure 2:
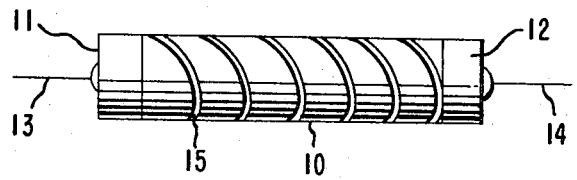

FIG. 1 illustrates a resistor in which a nonconductive rod serving as a base is completely covered with a compound of the invention; and FIG. 2 illustrates a resistor similar to that of FIG. 1, except that here a spiral groove is cut around the base used and through the electrically conductive coating into the nonconductive material underneath to lengthen the conductive path.

DETAILED DESCRIPTION OF THE INVENTION

Mixtures of about 1–3 parts by weight of PdMO$_2$ with one part of vitreous enamel or glass frit have been found to give good results. Such mixtures can, if desired, be further mixed with liquid or paste vehicles, e.g., water, alcohols, esters, liquid resins, and the like, with or without thickeners to provide compositions having a consistency suitable for the particular method to be used in applying the composition to the ceramic dielectric substrate. The finished resistor can be prepared by applying the composition to the ceramic dielectric substrate by conventional means, e.g., by spraying, stencilling, screen printing, dipping or brushing. The ceramic dielectric substrate can be composed of any ceramic material that can withstand firing temperature of the oxide-vitreous enamel composition, e.g., glass, porcelain, barium titanate, aluminum oxide, and the like. After the composition is applied in a uniform thickness, e.g., of the order of 15 to 25 microns, the composition is dried, if necessary, to remove solvent from the vehicle and then fired in a conventional lehr or furnace at a temperature at which the enamel frit is molten, whereby the conductive material is bonded to the ceramic dielectric.

This invention is illustrated by the following examples which describe the preparation of electrical resistor compositions containing PdCoO$_2$, PdCrO$_2$ and PdRhO$_2$ and the fabrication of electrical resistors based thereon.

EXAMPLE 1

(A) Preparation of resistor compositions based on PdCoO$_2$

A sample of palladium cobalt oxide (10 g.), prepared by heating overnight stoichiometric amounts of PdCl$_2$ and CoO at 700° C. in a sealed, evacuated silica tube, was ground in 5 ml. of water in a 1-quart ball-mill with 1 lb. of alumina balls until it passed 100% through a 325-mesh screen. The slurry was removed from the ball-mill and dried. The resulting palladium cobalt oxide was used to prepare the compositions listed in Table I. In these compositions, the proportions of ingredients are expressed in parts by weight and the glass used was a powdered (ball-milled) glass composed of: ZnO, 27.7%; SiO$_2$, 21.7%; B$_2$O$_3$, 26.7%; Al$_2$O$_3$, 5.8%; Na$_2$O, 8.7%; CaO, 3.9%; BaO, 0.8%; PbO, 0.7%; ZrO$_2$, 4.0%.

TABLE 1.—RESISTOR COMPOSITIONS

| Composition number | 1 | 2 | 3 |
|---|---|---|---|
| PdCoO$_2$ | 70 | 50 | 20 |
| Glass | 30 | 50 | 80 |
| Butyl Carbitol acetate | 150 | 150 | 150 |
| Ethyl cellulose (low viscosity) | 1 | 1 | 1 |

Three steatite (of the type known commercially as "Alsimag" 196) rods ⅛" in diameter and ¾" long were coated with composition No. 1 by dipping and then dried. The coated rods were fired at 800° C. for 15 minutes. Bands of commercial silver paste ⅛" wide were applied to each end of the rods and the rods were then fired at 540° C. for 10 minutes. Wires were attached to the silvered ends by means of tin/lead (63–37) solder. One of the composite resistors is shown in FIG. wherein 10 represents the coated and conductive surface of the resistor 11 and 12 the silver end bands, and 13 and 14 the conductive leads. This composition had a 4000 ohms/square sheet resistivity. The conductive paths of the coated rods were lengthened by cutting spiral grooves around the rods by means of a diamond tool in a lathe as shown in FIG. 2, where 15 represents a nonconductive groove cut in the conductive surface, the other numerals being as in FIG. 1. The resistance of the rod was raised by about a factor of 10 by this process. Different path lengths were formed on each of the three rods by varying the number of spirals.

The rods were then subjected to the "forming gas" test which consists of measuring the resistance of the rods before and after exposing them to forming gas (85% nitrogen and 15% hydrogen) at 100° C. for 3 hours. The resistance was measured by a commercial impedance bridge (General Radio, Type 1608A). A palladium-silver fixed resistor was used as a control. Results of tests on the above resistors are given in the following Table II.

TABLE II.—ELECTRICAL RESISTORS

| | Resistance, ohms | | |
|---|---|---|---|
| | Before exposing to forming gas | After exposing to forming gas | Loss in resistance, percent |
| Resistor: | | | |
| A | 81,200 | 79,040 | 2.7 |
| B | 74,680 | 72,800 | 2.5 |
| C | 108,050 | 107,610 | 0.4 |
| Control | 7,330 | 940 | 87.2 |

These tests show that the palladium cobalt oxide of this invention is capable of producing resistors that are much more stable in a reducing atmosphere than a commercial palladium-silver glaze resistor.

EXAMPLE 2

$PdCrO_2$ was prepared by heating overnight at 800° C. a mixture of 3.1920 g. of Pd, 5.3193 g. of $PdCl_2$, and 5.4564 g. of $LiCrO_2$ in a sealed, evacuated silica tube, while 100 atm. of argon was applied externally to minimize the possibility of vessel rupture. The recovered product was subjected to X-ray diffraction analysis, which indicated a single phase of $PdCrO_2$. No extraneous lines were observed in the diffraction spectrum.

A resistor composition was prepared from this product by mixing equal proportions by weight of the $PdCrO_2$ with glass frit. The glass frit was a low melting variety and was composed of 10% of $B_2O_3$, 25% of $SiO_2$ and 65% of $PbO_2$ by weight. The mixture of oxide and glass frit was mixed with a vehicle consisting of 8% of ethyl cellulose and 92% of β-terpineol to provide a suitable consistency. The mixture was then screen printed through a 165-mesh screen onto four alumina (96% dense $Al_2O_3$) substrates.

After the $PdCrO_2$-glass composition had been applied to the ceramic substrates in uniform thickness, the compositions were dried to remove the organic vehicle. The four assemblages were then fired in a conventional furnace at 850° C. for a 10 minute period. At the temperature of 850° C., the glass frit was molten, thereby bonding the conductive material to the ceramic dielectric.

The resulting resistor compositions were about 0.001" thick. Based on this thickness, the average room temperature resistivity for the four resistors, expressed in ohms/sq. was 1832. Resistivity measurements repeated at 125° C. showed an average temperature coefficient of resistivity in p.p.m./° C. over the range +25° C. to 125° C. of +379.

EXAMPLE 3

$PdRhO_2$ was prepared by heating 16 hours at 775° C. a mixture of 1.5200 g. of Pd, 2.5330 g. of $PdCl_2$ and 4.0526 g. of $LiRhO_2$ in a sealed evacuated silica tube, while 100 atm. of argon was applied externally to minimize the possibility of vessel rupture. The recovered product was subjected to X-ray diffraction analysis, which indicated essentially a single phase of $PdRhO_2$. Three very weak additional lines not consistent with the expected spectrum for $PdRhO_2$ were observed and probably were due to trace amounts of $Rh_2O_3$.

A resistor composition was prepared from this product by mixing equal proportions by weight of the $PdRhO_2$ with glass frit and organic vehicle as described in Example 2. This mixture was screen printed, dried and fired under identical conditions as those described in Example 2 to provide three resistors which were about 0.001" thick. The average room temperature resistivity value expressed in ohm/sq. for a 0.001" layer for the three samples was 9110. Resistivities of the three samples measured at 125° C. gave an average temperature coefficient of resistivity over the range 25° C.–125° C. in p.p.m/° C. of −223.

The embodiments of the invention in which an exclusive property or privilege is claimed are defined as follows:

1. An electrical resistor composition containing a powdered dielectrical material and an electrically conductive oxide substantially of the formula $PdMO_2$, wherein M is selected from the group Co and $CR_xRh_{1-x}$, and $x$ can have any value from 0 to 1; said oxide having a crystal structure based on the rhombohedral space group $R\bar{3}m$.

2. A composition of claim 1, wherein the powdered dielectric material is selected from the group vitreous enamel and glass frit.

3. A composition of claim 1, wherein the oxide is $PdCoO_2$.

4. A composition of claim 1, wherein the oxide has the formula $PdCr_xRh_{1-x}O_2$, and $x$ can have any value from 0 to 1.

5. A composition of claim 4 wherein the oxide is $PdCrO_2$.

6. A composition of claim 4 wherein the oxide is $PdRhO_2$.

7. A process for fabricating a ceramic electrical resistor comprising the steps of (a) applying to a ceramic dielectric substrate a composition of claim 1, and (b) firing at a temperature sufficient to melt the powdered dielectric material and to form a bonded coating of the electrically conductive oxide on the ceramic dielectric substrate.

8. An electrically conductive resistor containing a dielectric ceramic substrate having thereon a coating of an electrically conductive oxide of the formula $PdMO_2$, wherein M is selected from the group Co and $Cr_xRh_{1-x}$, and $x$ can have any value from 0 to 1.

9. A resistor of claim 8, wherein the oxide is $PdCoO_2$.

10. A resistor of claim 8, wherein the oxide has the formula $PdCr_xRh_{1-x}O_2$, and $x$ can have any value from 0 to 1.

11. A resistor of claim 8, wherein the oxide is $PdCrO_2$.

12. A resistor of claim 8, wherein the oxide is $PdRhO_2$.

References Cited

UNITED STATES PATENTS 3,414,371  12/1968  Rogers _____ 23—50

WILLIAM L. JARVIS, Primary Examiner

U.S. Cl. X.R.

106—53; 117—229; 252—518; 338—308